(12) United States Patent
Srinivasa et al.

(10) Patent No.: US 7,977,906 B1
(45) Date of Patent: Jul. 12, 2011

(54) SACCADIC TRACKING FOR AN ELECTRO-MECHANICAL SYSTEM

(75) Inventors: Narayan Srinivasa, Oak Park, CA (US); Youngkwan Cho, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 385 days.

(21) Appl. No.: 12/228,579

(22) Filed: Aug. 14, 2008

(51) Int. Cl.
G05B 13/00 (2006.01)
(52) U.S. Cl. ... 318/561; 318/560; 318/569; 318/568.22; 318/568.18
(58) Field of Classification Search ............... 318/561, 318/560, 569, 568.22, 568.18
See application file for complete search history.

(56) References Cited

U.S. PATENT DOCUMENTS

| | | | | |
|---|---|---|---|---|
| 4,990,838 | A * | 2/1991 | Kawato et al. | 700/246 |
| 5,498,943 | A * | 3/1996 | Kimoto et al. | 318/601 |
| 5,774,632 | A * | 6/1998 | Kaske | 706/25 |
| 7,499,894 | B2 * | 3/2009 | Marom et al. | 706/23 |

OTHER PUBLICATIONS

Piaget, J., "Commentary on Vygotsky," New Ideas in Psychology, vol. 18, pp. 241-259, 2000.
Barto, A.G., "Reinforcement learning," in M.A. Arbib (ed.) Handbook of Brain Theory and Neural Networks, pp. 804-809, MIT Press, Cambridge, MA 1995.
Srinivasa, N., and Sharma, R., "Execution of Saccades for active vision using a neuro-controller," IEEE Control Systems, Special Issue on Intelligent Control, pp. 18-19, Apr. 1997.
Wei, G. Q., and Ma, S.D., "Implicit and explicit cameral calibration: theory and experiments," IEEE trans. On Pattern Analysis and Machine Intelligence, vol. 16, pp. 469-480, 1994.
Srinivasa, N., and Ahuja, N., "A learning approach to fixate on 3D targets with active cameras," Lecture Notes in Computer Science, vol. 1351, pp. 623-631, Springer-Verlag, Jan. 1998.
Sparks, D. and Mays, L.E., "Spatial Localization of saccade targets I: Compensation for stimulation induced perturbations in eye position," Journal of Neurophysiology, vol. 49, pp. 45-63, 1983.
Barto, A..G., and Sutton, R.S., "Simulation of anticipatory responses in classical conditioning by a neuron-like adaptive element," Behavioral Brain Research, vol. 4, pp. 221-235, 1982.
Bullock, D., et al., "A Self-Organizing neural model of motor equivalent reaching and tool use by a multijoint arm," Journal of Cognitive Neuroscience, vol. 5, pp. 408-435, 1993.
Gaudiano, P. and Grossberg, S., "Vector Associative Maps: Unsupervised real-time error-based learning and control of movement trajectories," Neural Networks, vol. 4, No. 2, pp. 147-183, 1991.

(Continued)

Primary Examiner — Walter Benson
Assistant Examiner — David S Luo
(74) Attorney, Agent, or Firm — Tope-McKay & Assoc.

(57) ABSTRACT

Described is a fault-tolerant electro-mechanical system that is able to saccade to a target by training and using a signal processing technique. The invention enables tracking systems, such as next generational cameras, to be developed for autonomous platforms and surveillance systems where environment conditions are unpredictable. The invention includes at least one sensor configured to relay a signal containing positional information of a stimulus. At least one actuator is configured to manipulate the sensor to enable the sensor to track the stimulus. A processing device is configured to receive positional information from each sensor and each actuator. The processing device sends a positional changing signal to at least one actuator and adjusts at least one positional changing signal according to the information from each sensor and each actuator to enable the actuator to cause the sensor to track the stimulus.

27 Claims, 14 Drawing Sheets

OTHER PUBLICATIONS

Srinivasa, N. and Sharma, R., "Efficient learning of VAM-based Representation of 3D targets and its active vision applications," Neural Networks, vol. 11, No. 1, pp. 153-172, Jan. 1998.

Fiala, J.C., "A network of learning kinematics with application to human reaching midels," IEEE International Conference on Neural Networks, Orlando, FL., 1994.

M.W. Walker, D.E. Orin, "Efficient Dynamic Computer Simulation of Robotic mechanisms," Journal of Dynamic Systems, Measurement and Control, vol. 104, pp. 205-211, 1982.

* cited by examiner

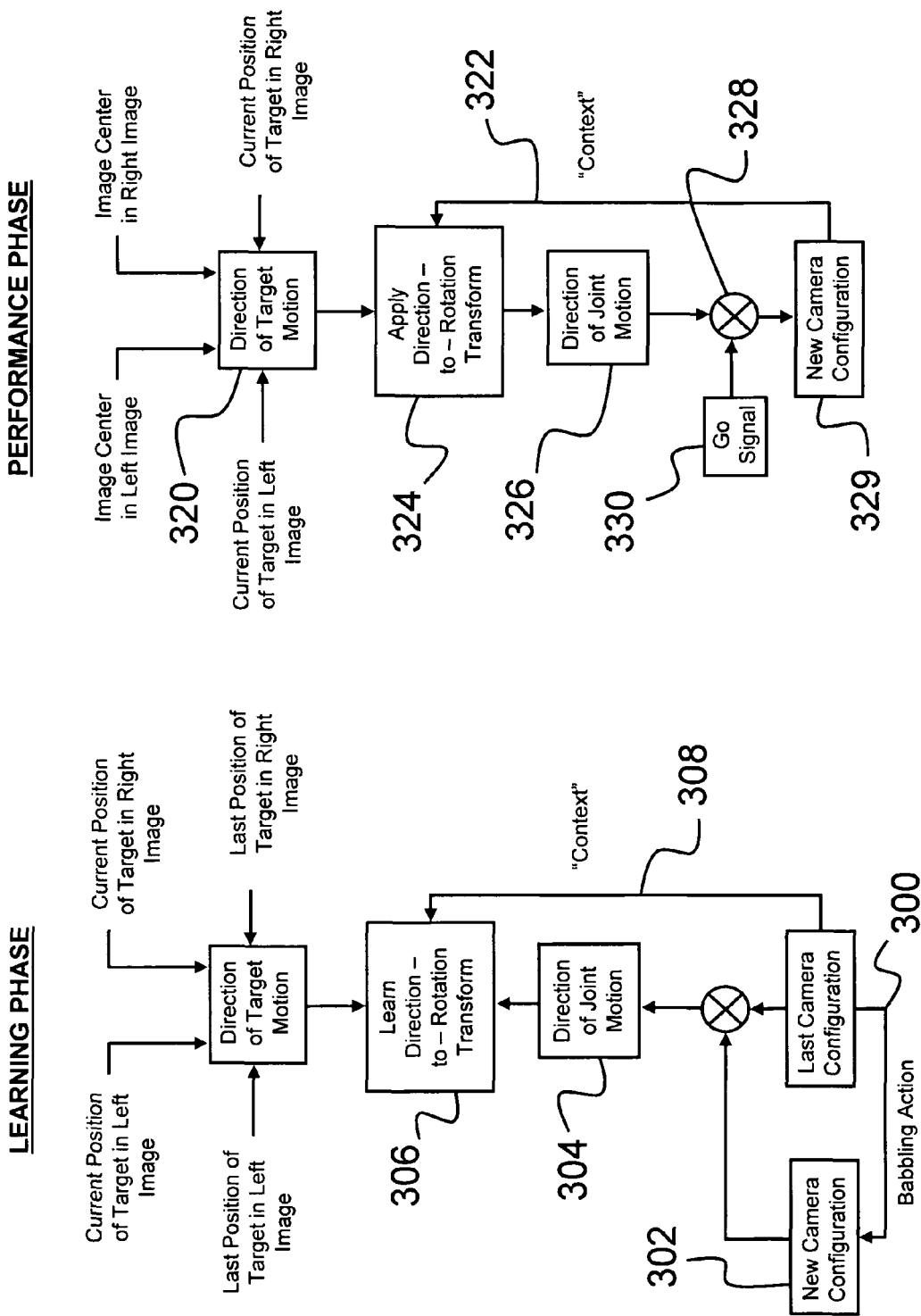

| Joint 400 | Min(deg) 402 | Max(deg) 404 | Number of Angular Zones 406 |
|---|---|---|---|
| $\alpha_N$ | -60 | 30 | 5 |
| $\beta_N$ | -90 | 90 | 5 |
| $\gamma_N$ | -60 | 60 | 3 |
| $\alpha_H$ | -45 | 45 | 3 |
| $\alpha_C$ | -60 | 60 | 7 |
| $\beta_{LC}$ | -60 | 60 | 7 |
| $\beta_{RC}$ | -60 | 60 | 7 |

FIG. 4

| Network Cells/Computations | Learning Phase | Performance Phase |
|---|---|---|
| Direction Cells (S) | $\dfrac{dS_j}{dt} = -\lambda S_j + (1-S_j)s_j - S_j \sum_{l \neq j} s_l$ | $\dfrac{dS_j}{dt} = -\lambda S_j + (1-S_j)d_j - S_j \sum_{l \neq j} d_l$ |
| Difference Cells (V) | $\dfrac{dV_{ik}}{dt} = \alpha\left(-V_{ik} + \sum_j z_{ijk} S_j - R_i\right)$ | $\dfrac{dV_{ik}}{dt} = \alpha\left(-V_{ik} + \sum_j z_{ijk} S_j - R_i\right)$ |
| Joint Rotation Cells (R) | $\dfrac{dR_i}{dt} = \delta(r_i - R_i)$ | $\dfrac{dR_i}{dt} = \delta\left(-R_i + \sum_k V_{ik}\right)$ |
| Weights (Z) | $\dfrac{dz_{ijk}}{dt} = -\gamma V_{ik} S_j$ | $\dfrac{dz_{ijk}}{dt} = 0$ |
| Joint Configuration ($\theta$) | $\theta_i = \theta_i^{\min} + rand * (\theta_i^{\max} - \theta_i^{\min}); i=1,\ldots,7$ $\theta_1 = \alpha_N; \theta_2 = \beta_N; \theta_3 = \gamma_N; \theta_4 = \alpha_H;$ $\theta_5 = \alpha_C; \theta_6 = \beta_C; \theta_7 = \gamma_C;$ | $\dfrac{d\theta_i}{dt} = -\eta\theta_i + G[R_i] + \theta_{old}; i=1,\ldots,7$ |
| Context Selection | $C_k = \|\theta_k - \theta\|$ $k = \min_k (C_k)$ | $C_k = \|\theta_k - \theta\|$ $k = \min_k (C_k)$ |

FIG. 5

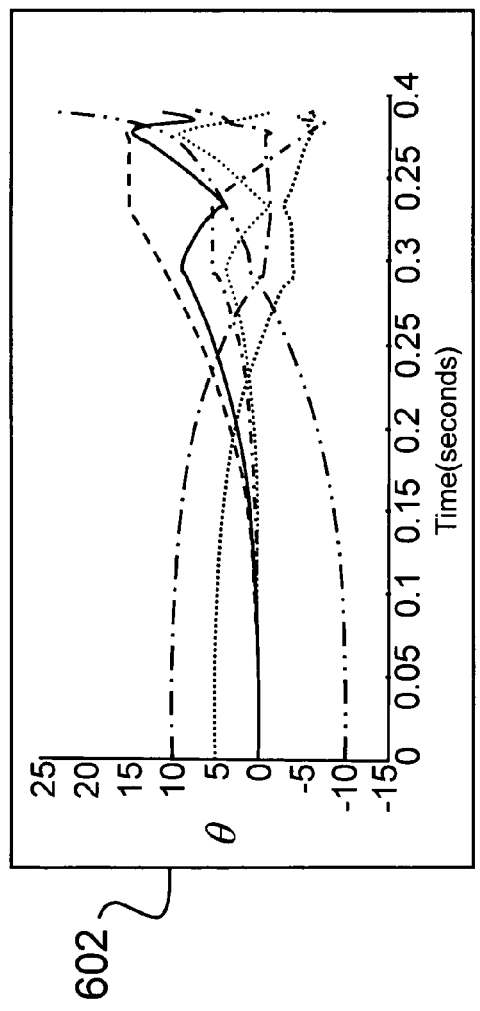
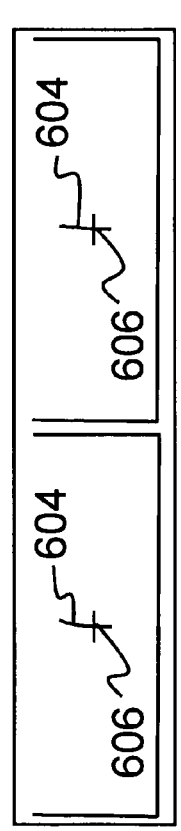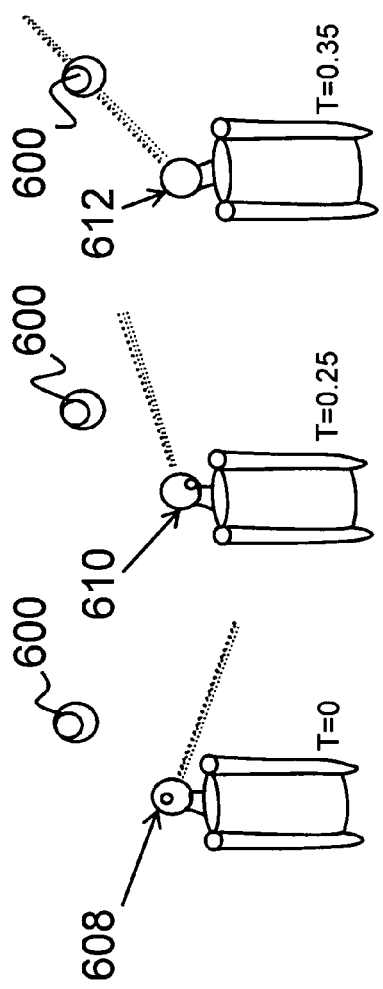
FIG. 6A
FIG. 6B
FIG. 6C

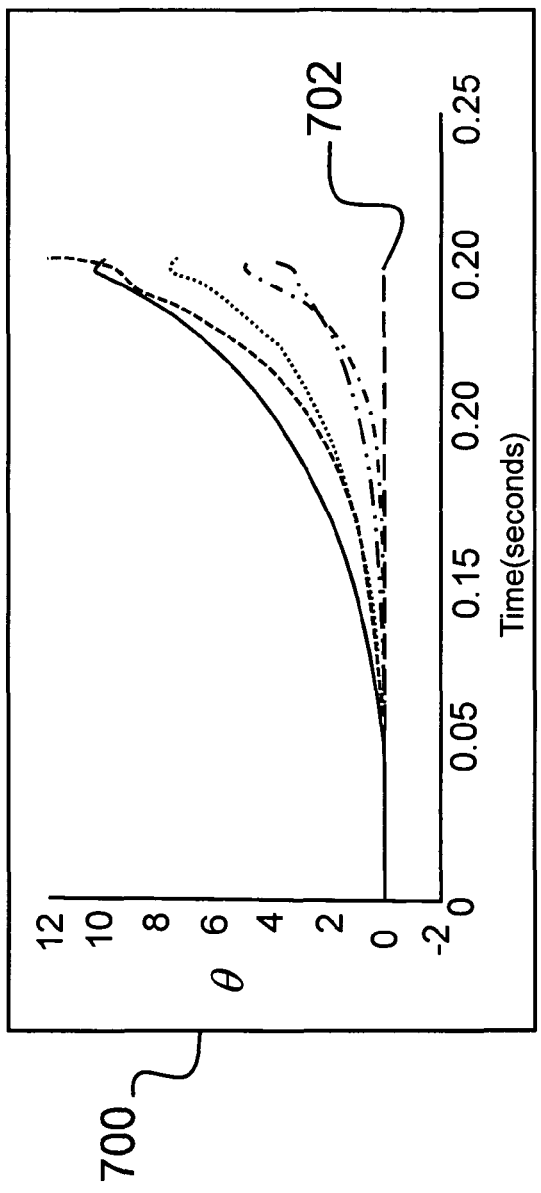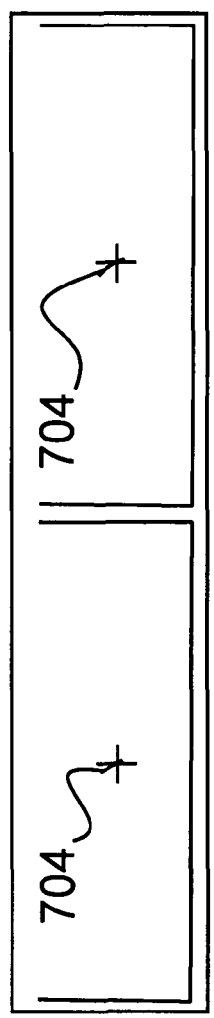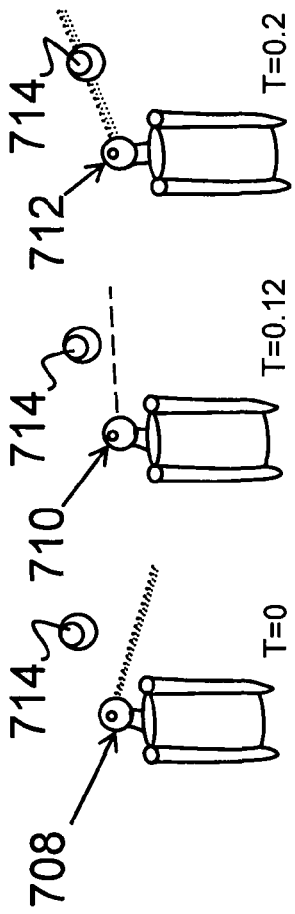
FIG. 7A
FIG. 7B
FIG. 7C

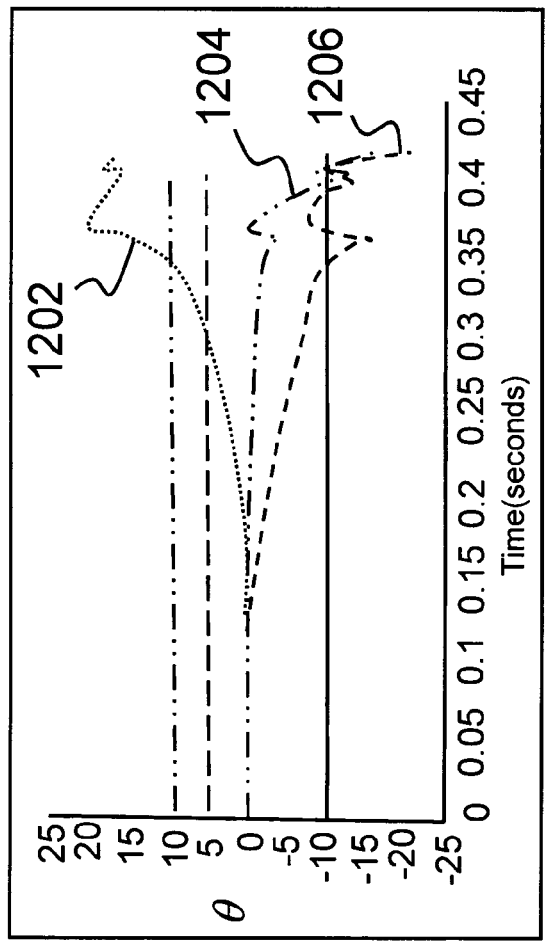
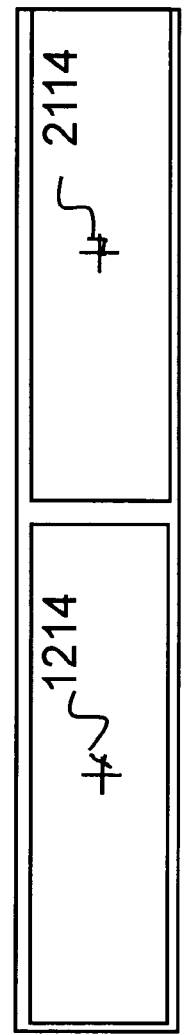
FIG. 12A
FIG. 12B
FIG. 12C

SACCADIC TRACKING FOR AN ELECTRO-MECHANICAL SYSTEM

FIELD OF INVENTION

The present invention relates to an electro-mechanical tracking system and, more particularly, to an electro-mechanical tracking system that is capable of learning how to perform saccadic tracking.

BACKGROUND OF INVENTION

In humans and many other vertebrates, there are a few basic types of eye movements. A common eye movement is gaze fixing, which is used to maintain the gaze affixed with a distant point. Such gaze fixing movements are the result of compensating for head movements by moving the eyes in an equal and opposite direction to the head movements. These movements are either driven by the balance organs of the inner ear (called the vestibule-ocular reflexes (VOR)) or, alternatively, driven by the retinal image motion in a feedback loop (called the optokinetic responses (OKR)). Another main class of eye movement is saccadic eye movement. Saccadic eye movement comes about because the fovea (center high-resolution portion of the retina) has a high concentration of color sensitive photoreceptor cells, called cone cells. The rest of the retina is primarily made of monochrome photoreceptor cells, called rod cells (which are particularly good for motion detection). By moving the eye so that small parts of a scene can be sensed with greater resolution, body resources can be used more efficiently. The eye movements disrupt vision and, hence, humans have evolved to make these movements as fast and as short in duration as possible. Such fast and short eye movements are termed saccadic eye movements.

Furthermore, perceiving without acting is unusual. For example, visually scrutinizing an object presupposes saccades at it and sometimes involves moving the head or even the whole body. Similarly, to accurately localize a sound source it becomes necessary to move one's head and ears toward the sound source. Acting without perceiving seldom makes sense; after all, actions defined as goal-directed behavior aim at producing some perceivable event—the goal. Performing an appropriate action requires perceptual information about suitable starting and context conditions and, in the case of complex actions, about the current progress in the action sequence. Thus, perception and action are interlinked and interdependent.

There are several behavioral repertoires in which this interdependency is manifested in humans and other species. In the simplest form, a behavior is triggered by the present situation and reflects the animal's immediate environmental conditions. This type of behavior is often referred to as stimulus-response reflexes. A good example of this type of behavior in humans is provided by the orientation reflex, which is exhibited when encountering a novel and unexpected event. On the one hand, this reflex inhibits ongoing actions and tends to freeze the body—a stimulus triggered response. At the same time, it also draws attention towards the stimulus source by increasing arousal and facilitating stimulus-directed body movements. This interdependency between stimulus and response creates an action/perception cycle (see literature reference no. 6), wherein a novel stimulus triggers actions that lead to a better perception of itself or its immediate environment condition, and the cycle continues.

Human behavior is much more robust than exclusive control by stimulus-response cycles. One of the hallmarks of human capabilities is the ability to learn new relations between environmental conditions and appropriate behavior during action/perception cycles. This learning process provides an enormous gain in flexibility for an individual in allowing it to adapt to environmental changes. Not only do humans learn to react to particular environment conditions and situations in a certain way, humans can also unlearn what has been acquired and learn new relationships between situations and actions. Furthermore, a feature of the human eye system is that the total degrees-of-freedom available for use to perform coordinated eye movements is far greater than that required to fixate or saccade to three-dimensional (3-D) targets.

There have been several attempts to develop robotic camera systems that can saccade to 3-D targets (see literature reference nos. 1 through 5). However, none of the previous attempts have successfully demonstrated a fully, self-organized approach to learning how to perform saccadic control despite redundancies in the system. Such a control system would offer robustness to various disturbances that the system has not experienced apriori.

For the foregoing reasons, there is a need for an apparatus that is able to utilize a self-organized, robust approach to learn how to perform saccadic control despite redundancies in the system.

SUMMARY OF INVENTION

The present invention is an electro-mechanical system for tracking a target that satisfies the need to utilize a self-organized, robust approach in learning how to perform saccadic control despite redundancies in the system.

An embodiment of the present invention is a visuomotor system comprising a neck portion, a head portion, and two cameras, the head being connected to the neck and the cameras being connected to the head. Here, the number of degrees-of-freedom available is more than the goal specification. This system is an example of a redundant degree-of-freedom system because there are several possible solutions to saccade to a given three-dimensional target.

The present invention includes a processing device configured to receive positional signals of the neck, head, and cameras as well as visual signals relaying the image of a target on the cameras.

More specifically, the present invention is an electro-mechanical system that includes at least one sensor (e.g., camera) configured to relay a signal containing positional information of a stimulus. At least one actuator is configured to manipulate the sensor to enable the sensor to track the stimulus. The actuator includes actuator positional information and is further configured to send the actuator positional information to a processing device and receive a positional changing signal from the processing device. The processing device is configured to receive the positional information from each sensor and each actuator. The processing device is further configured to send a positional changing signal to at least one actuator and adjust at least one positional changing signal according to the information from each sensor and each actuator to enable the actuator to cause the sensor to track the stimulus.

In another aspect, the system includes a base with a neck portion connected with the base through rotational actuators such that the neck portion includes three degrees-of-freedom with respect to the base. A head portion is connected with the neck portion by a rotational actuator to provide at least one degree-of-freedom with the respect to the neck portion. The at least one sensor is connected with the head portion by rotational actuators such that the at least one sensor includes at least two degrees-of-freedom with respect to the head portion. At least one additional sensor is connected with the head portion by rotational actuators such that the at least one additional sensor includes at least two degrees-of-freedom with respect to the head portion. Furthermore, the neck portion, head portion, and sensors have redundant degrees-of-freedom in three-dimensional space and each degree-of-freedom has a joint angle. Finally, the processing device is configured to send positional changing signals to the rotational actuators to cause the neck portion, head portion, and sensors to move to track the stimulus.

In another aspect, the processing device includes a neural network and is further configured to use the neural network to linearly transform sensor information into positional changing signals.

In yet another aspect, the processing device is further configured to enact a learning phase and a performance phase. In the learning phase, a plurality of random positional changing signals are sent to the actuators to cause the head portion, neck portion, and sensors to move to a distinctly different configuration. Additionally, a set of micro-saccades are performed and a direction-to-rotation transform is learned at each different configuration. In the performance phase, a desired spatial direction to a retinal image center is computed, with the desired spatial direction then combined with a context of the system and the direction-to-rotation transform to compute desired joint angle increments. The joint angle increments are integrated over time to saccade to the stimulus by providing new sensor configurations.

In the performance phase, the processing device is further configured to compute new joint angles by multiplying the joint angle increments with a GO signal to obtain a joint angle velocity vector.

In the learning phase, the processing device is further configured to use the neural network to vary a weight of network connections within the neural network between input signals and output signals according to the following equation:

$$\frac{dz_{ijk}}{dt} = -\gamma V_{ik} S_j,$$

wherein, $z_{ijk}$ is the weight of the network connection between sensor information $S_j$ and an output signal $V_{ik}$ while actuators are in state i, and $\gamma$ is a learning constant. In another aspect, at least one sensor is able to detect the presence and current position of a stimulus through a technique selected from a group consisting of electromagnetically, aurally, tactilely, and visually.

In yet another aspect, the processing device is further configured to receive the positional information of the stimulus from the sensor. The processing device alters the position of the sensor and detects a change in a perceived position of the stimulus due to the altered position of the sensor. The processing device uses the detected change to adjust parameters in a joint configuration algorithm. Finally, a positional changing signal is produced in accordance with the joint configuration algorithm to cause the sensor to track the stimulus.

Finally, as can be appreciated by one skilled in the art, the present invention also comprises a method and computer program product. The method comprising acts of performing the operations described herein, with the computer program product comprising instruction means for causing a computer (processing device) to perform the operations.

BRIEF DESCRIPTION OF DRAWINGS

These and other features, aspects, and advantages of the present invention will become better understood with regard to the following description, appended claims, and accompanying drawings where:

FIG. 3A is a flowchart depicting a learning phase according to the present invention;

FIG. 3B is a flowchart depicting a performance phase according to the present invention;

FIG. 4 is a table of exemplary joint configurations that can be used to create a context field;

FIG. 5 is a table depicting exemplary equations that can be solved during the learning and performance phases;

FIG. 6A is a chart illustrating an exemplary saccade sequence of the apparatus of FIG. 1 under normal operation;

FIG. 6B is an illustration depicting the spatial trajectory of the target of FIG. 1 during the saccade of FIG. 6A;

FIG. 6C is an illustration of the apparatus of FIG. 1 during the saccade of FIG. 6A;

FIG. 7A is a chart illustrating an exemplary saccade sequence of the apparatus of FIG. 1 with one degree-of-freedom fixed;

FIG. 7B is an illustration depicting the spatial trajectory of the target of FIG. 1 during the saccade of FIG. 7A;

FIG. 7C is an illustration of the apparatus of FIG. 1 during the saccade of FIG. 7A;

FIG. 12A is a chart illustrating an exemplary saccade sequence of the apparatus of FIG. 1 with four degrees-offreedom fixed, a change in focal length of the cameras, and a change in the baseline distance between the cameras;

FIG. 12B is an illustration depicting the spatial trajectory of the target of FIG. 1 during the saccade of FIG. 12A;

FIG. 12C is an illustration of the apparatus of FIG. 1 during the saccade of FIG. 12A;

DETAILED DESCRIPTION

Figure 1:
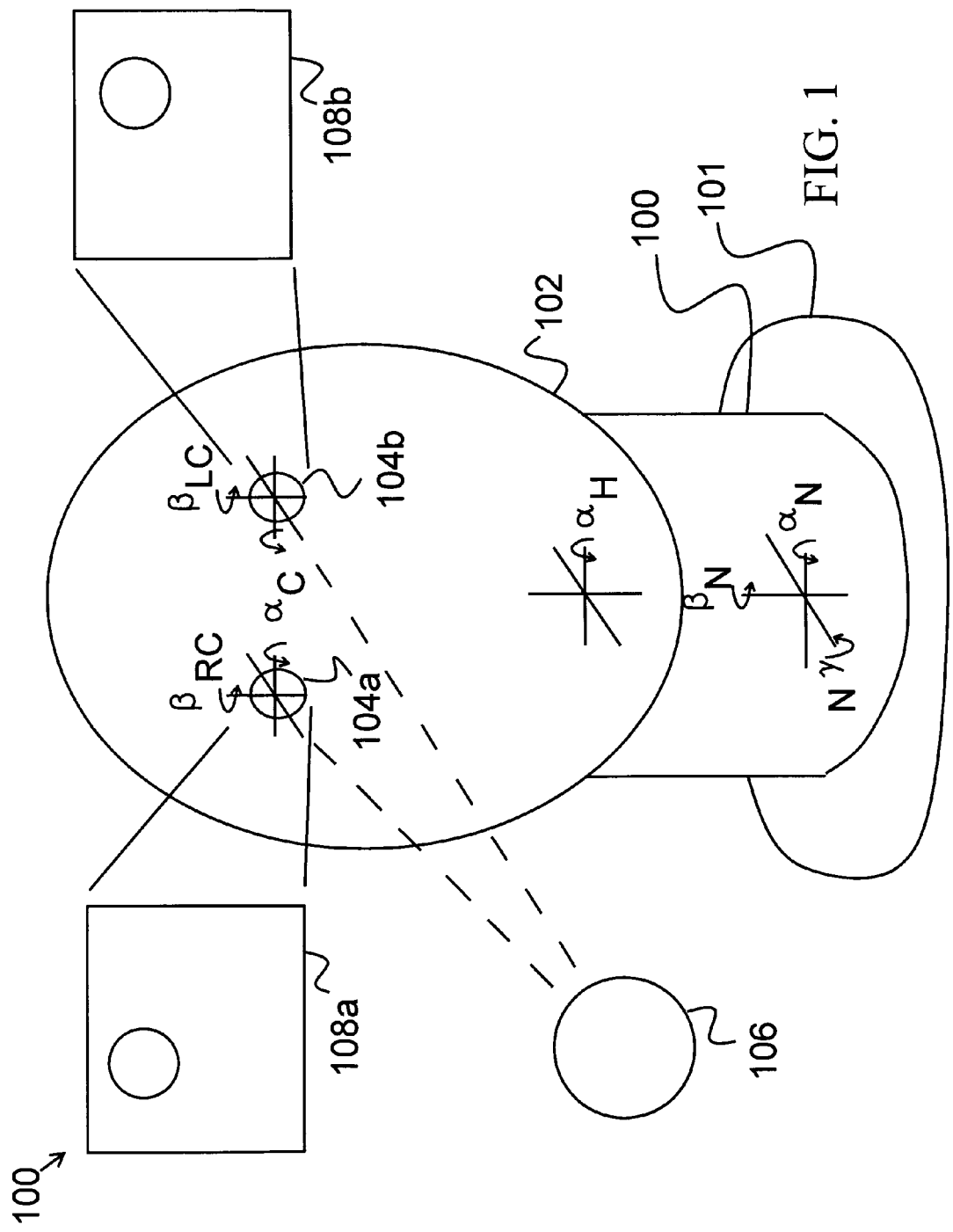
FIG. 1 is an illustration of an apparatus with a visuomotor system according to the present invention, depicted along with a spherical target.

The present invention relates to a tracking system and, more particularly, to a tracking system that is capable of learning how to perform saccadic tracking. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Following the list of cited references, a glossary is provided that includes a number of terms that may be unfamiliar to the reader. Subsequently, an overview is provided that provides the reader with a general understanding of the present invention. Thereafter, specific details of the present invention are provided to give an understanding of the specific aspects. Finally, experimental results are presented to demonstrate the efficacy of the present invention.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number.

1. Srinivasa, N., and Sharma, R. "Execution of Saccades for Active Vision Using a Neuro-controller," *IEEE Control Systems, Special Issue on Intelligent Control*, pp. 18-29 April 1997.
2. Sharma, R., "Active vision for Visual Servoing: A Review," in *IEEE Workshop on Visual Servoing: Achievements, Applications and Open Problems*, May 1994.
3. Wei, G. Q., and Ma, S. D., "Implicit and Explicit Camera Calibration: Theory and Experiments," *IEEE Trans. On Pattern Analysis and Machine Intelligence*, vol. 16, pp. 469-480, 1994.
4. Srinivasa, N. and Ahuja, N., "A Learning Approach to Fixate on 3D Targets with Active Cameras," *Lecture Notes in Computer Science*, vol. 1351 pp. 623-631, Springer-Verlag, January, 1998.
5. Sparks, D. and Mays, L. E., "Spatial Localization of Saccade Targets I: Compensation for stimulation Induced perturbations in eye position," *Journal of Neurophysiology*, vol. 49, pp. 49-63, 1983.
6. Piaget, J., Commentary on Vygotsky. *New Ideas in Psychology*, vol. 18 pp. 241-259, 2000.
7. Bullock, D., Grossberg, S. and Guenther, F. H., "A Self-Organizing Neural Model of Motor Equivalent Reaching and Tool Use by a Multijoint Arm." *Journal of Cognitive Neuroscience*, vol. 5, pp. 408-435, 1993.
8. Gaudiano, P. and Grossberg, S., "Vector Associative Maps: Unsupervised real-time error-based learning and control of movements trajectories," *Neural Networks*, vol. 4, no. 2 pp. 147-183, 1991.
9. Srinivasa, N. and Sharma, R., "Efficient Learning of VAM-based Representation of 3D Targets and its Active Vision Applications," *Neural Networks*, vol. 11, no. 1, pp. 153-172, January, 1998.
10. Fiala, J. C., "A Network of Learning Kinematics with Application to Human Reaching Models," *IEEE International Conference on Neural Networks*, Orlando, Fla.
11. Walker, M. W. and Orin, D. E., "Efficient Dynamic Computer Simulation of Robotic Mechanisms," *Journal of Dynamic Systems, Measurement and Control*, vol. 104, pp. 205-211, 1982.

(2) Glossary

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Babbling action—The term "babbling action" generally refers to a quick, random change in the joint configuration of the apparatus and is synonymous with microsaccade.

Context—The term "context" generally refers to a predetermined discrete configuration of the joints of the apparatus within the range of motion of the apparatus.

Context Field—The term "context field" generally refers to the collection of all contexts. It is significantly smaller than all possible configurations within the range of motion of the apparatus.

GO Signal—The term "GO signal" generally refers to procedure that compares the present and desired positions of an actuator, and sends a velocity command to the actuator if the difference is large enough.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

Learning Phase—The term "learning phase" generally refers to a period when babbling actions are used to determine the weights of the network connections.

Neuron—The term "neuron" generally refers to a node of a neural network.

Performance Phase—The term "performance phase" generally refers to a period when the visuomotor system uses learned properties to respond to a moving target.

R cell—The term "R cell" generally refers to a neuron that compares the error between the desired and current positions of a joint and creates a signal proportional to the error.

S cell—The term "S cell" generally refers to a neuron that is able to compare the image of a target at two discrete time steps and determine the change of position of the image.

V cell—The term "V cell" generally refers to a neuron which has an output that is proportional to the desired configuration of a joint.

(3) Overview

The human visual system is an active system that can be controlled by the brain in a deliberate fashion to extract useful information about an environment. The visuomotor system according to the present invention is a computer-simulated version of the human active vision system. The visuomotor system has a seven degree-of-freedom angular position control (extrinsic parameters) and two degrees-of-freedom (change in aperture and separation in baseline between the eyes). The system has more degrees-of-freedom than required to saccade to a 3-D target, thereby making the system redundant. As shown in FIG. 1, a visuomotor system 101 comprises a neck portion 100 (attached to a base 101) that is able to rotate about all three Cartesian coordinate axes at one end. The neck portion 100 is attached with the base 101 via a plurality of actuators. A head portion 102 is attached to the neck portion 100 (via at least one actuator) and is also able to pivot about at least one Cartesian coordinate axis with respect to the neck portion 100. Two sensors 104a and 104b (e.g., cameras) are attached to the head portion 102 (via actuators) and capable of capturing and/or generating images 108a and 108b of a target 106. It should be understood by one skilled in the art that the present invention is not limited to two sensors and includes any suitable number of sensors, from one to a plurality of sensors. Further, the sensors are any suitable mechanism or device that is operable for detecting the present and current position of a stimulus (i.e., object), non-limiting examples of which include being able to aurally, tactilely, visually, and electromagnetically detect the stimulus. Additionally, it should also be noted that the base portion, neck portion, and head portion are not intended to denote any fixed anatomical position but are used to illustrate various operable portions of the apparatus. The actuators are mechanisms or devices that operate as joints to allow the various components to rotate with respect to one another, a non-limiting example of which includes a motor and axle.

Additionally, the two sensors 104a and 104b and are able to rotate (via rotational actuators) about at least two Cartesian coordinate axes with respect to the head portion 102. The baseline position of the two sensors 104a and 104b can also be varied. The sensors 104a and 104b are also capable of independent pans and focal length adjustment. Thus, as can be appreciated by one skilled in the art, the entire system 101 has enough degrees-of-freedom to track the target 106.

Figure 2A:
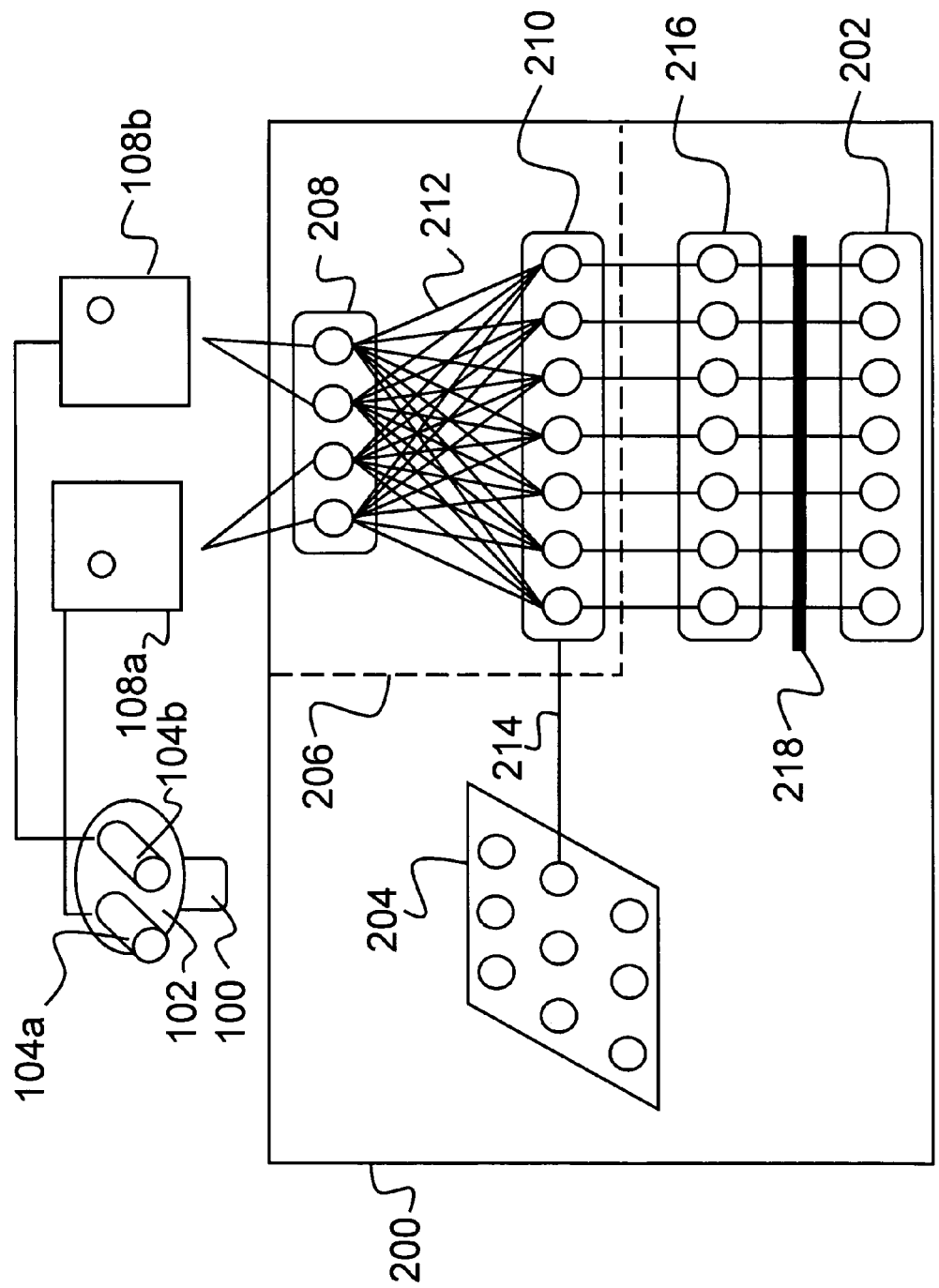
FIG. 2A is an illustration of the visuomotor system attached with a processing device containing a neural network.

As shown if FIG. 2A, the visuomotor system also comprises a processing device 200 that receives signals containing the images of a target 108a and 108b from the cameras 104a and 104b. The processing device 200 also receives signals containing the joint configuration 202 of the neck portion 100, head portion 102, and cameras 104a and 104b.

The processing device 200 comprises an input for receiving the signals. Note that the input may include multiple "ports." Typically, input is received from at least one sensor, non-limiting examples of which include video image sensors (i.e., camera). An output is connected with the processing device 200 for providing information regarding the presence and/or identity of object(s) in the scene to a user or other systems in order that a network of computer systems may serve as a tracking system. Output may also be provided to other devices or other programs; e.g., to other software modules, for use therein. The input and the output are both coupled with a processor, which may be a general-purpose computer processor or a specialized processor designed specifically for use with the present invention. The processor is coupled with a memory to permit storage of data and software that are to be manipulated by commands to the processor.

The processing device 200 also contains a context field 204 and neural network 206. Furthermore, the processing device 200 sends positional changing signals for the actuation (controlling movements) of the neck portion 100, head portion 102, and cameras 104a and 104b. The neural network 206 is comprised of S cells 208 that receive the images 108a and 108b of the target. The S cells 208 send this signal to V cells 210 via network weights 212. The context field 204 receives the joint configuration 202 and sends a context 214 to the neural network 206 for the activation of certain V cells 210 and network weights 212. Babbling actions and active V cells 210 send signals to R cells 216. Signals from the R cells 216 are passed through a GO signal 218 and then used to update the joint configuration 202.

(4) Specific Details (4.1) Self-Organized Learning of Saccades Via Babbling Actions The visuomotor system is setup to look at 3-D targets in its visible space for various joint configurations of the system. Each joint configuration, $\theta$, corresponds to a unique joint position of each of the seven degrees-of-freedom (three neck portion—$\alpha_N$, $\beta_N$, $\gamma_N$; one head portion—$\alpha_H$; and three camera—$\alpha_c$, $\beta_{LC}$, $\beta_{RC}$ rotation angles). These joint configurations represent the internal context for the learning system and are shown in FIG. 1.

At each joint configuration, the visuomotor system performs a set of babbling actions wherein the joints of the system are exercised to move in small increments. These actions cause the image of the 3-D target to translate in various directions within the image plane of each camera. The differential relationship between the spatial directions of target image to the joint rotations of the visuomotor system as a result of the microsaccades during learning phase is a linear mapping. The system learns this mapping in a self-organized fashion (as described below). For a redundant system, like the visuomotor system in this embodiment of the present invention, this linear mapping is one-to-many. This implies that there exists several possible linear combinations of solutions (from spatial directions of the target image in the stereo camera to visuomotor system joint configuration changes) that can generate an image space trajectory of the target that is continuous in joint space and correctly directed in the 4-D space. For instance, two direction vectors corresponding to the stereo pair are directed towards the image center for each camera (i.e., to saccade). For example, to look at a 3-D target, it is possible to move only the camera joints of θ in order to fixate on the target. At the same time, it may also be possible to use some of the other joints, including the head portion and neck portion and camera joints, to fixate on the same 3-D target. Joint space continuity is ensured because all solutions are in the form of joint angle increments with respect to the present fixed joint configuration of the visuomotor system.

This synchronous collection of increments to one or more joint angles of the visuomotor system is called a joint synergy (see literature reference no. 7). During the self-organized learning process, the visuomotor system learns to associate a finite number of joint synergies to the spatial direction of image movement in the stereo camera that results when these synergies are activated for a given θ. During performance, a given desired movement direction of the target (in the case of saccades, the desired direction is toward the retinal image center) can be achieved by activating in parallel any linear combination of the synergies that produces the corresponding image movement direction. This simple control strategy leads to motor equivalence when different linear combinations are used on different movement trials.

The self-organized learning process utilizes a neural network model that will now be described. As noted above, the neural network 206 for learning to saccade to 3-D targets is shown in FIG. 2A. The network 206 consists of three types of cells. The S cell 208 encodes the spatial directions of the target when the camera is either babbling or performing a learned saccadic movement. The V cells 210 encode the difference between weighted inputs from the direction cells (i.e., S cells 208 and R cells 216). R cells 216 encode the joint rotation direction or increments of the visuomotor system. The network adapts the weights between the S cells 208 and the V cells 210 based on the difference of activity between the spatial directions of the target motion in the cameras 104a and 104b to the joint rotations of the visuomotor system. The present invention uses any suitable process for adapting the weights, a non-limiting example of which includes the Vector Associative Maps (VAM) learning approach (see literature reference nos. 8 and 9).

During the learning phase, the V cell 210 activity drives the adjustment of the weights. This process is akin to learning the pseudo-inverse of the Jacobian between spatial directions to joint rotations. During the performance phase, weights generated during the learning phase are used to drive the R cells 216 to the desired increments in joint rotation.

Figure 2B:
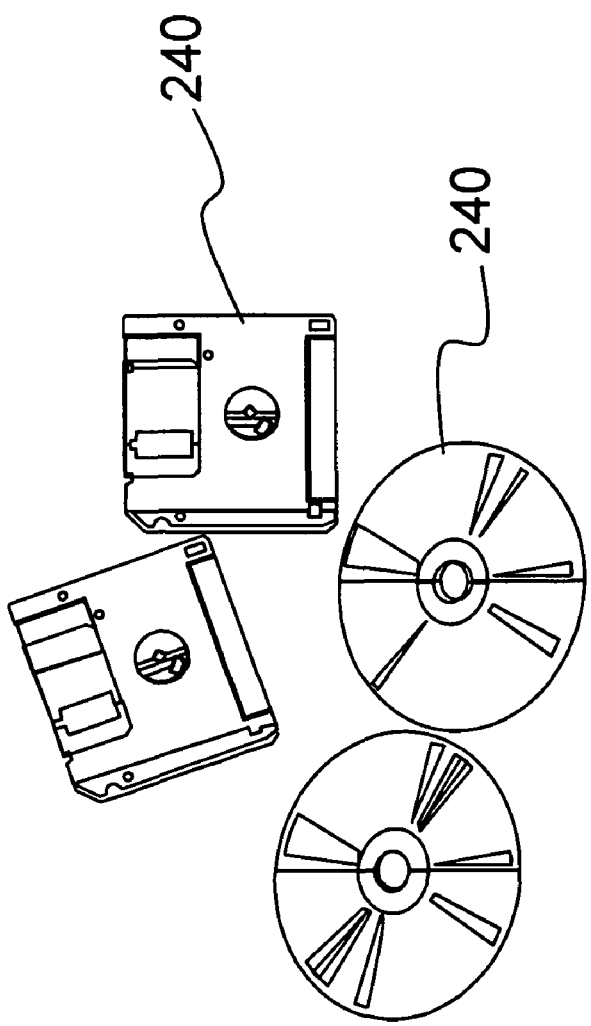
FIG. 2B is an illustration of a computer program product embodying the present invention.

It should be noted that the present invention also includes a computer program product that includes instruction means for causing the processor to perform the operations described herein. An illustrative diagram of a computer program product embodying the present invention is depicted in FIG. 2B. The computer program product 240 is depicted as an optical disk such as a CD or DVD. However, as mentioned previously, the computer program product generally represents computer-readable instruction means stored on any compatible computer-readable medium.

In order to ensure that the correct linear mapping is learned and the motor equivalence can be addressed, the learning process has to account for the joint configuration θ under which the learning of the mapping takes place. Each joint configuration is referred to as the context. The context field is referred to as a set of neurons that encode various contexts that span the joint space of the visuomotor camera system (see literature reference no 12). The neuron in the context field strongly inhibits the V cells 210 allocated for that context. When a neuron in the context field is excited due to the system being in the appropriate joint configuration, it momentarily inhibits the V cells 210 allocated for that context and this allows the learning process to adapt weights in a manner that enables the computation of the correct linear mapping described above. Flowcharts in FIGS. 3A and 3B summarize the network connections of the model for these two phases (i.e., the learning phase and the performance phase).

(4.2) Learning Phase

The sequence of steps during the learning phase is summarized in FIG. 3A. The system is trained using a single 3-D target (a sphere) during babbling action cycles to learn the appropriate weights to saccade to the target. The process begins by motor-babbling 300, where the visuomotor system performs random joint movements (which result in new camera configurations 302) that exercise all the seven degrees-of-freedom. These movements are two types.

First, it performs a gross movement wherein the system moves to distinctly different joint configurations (with corresponding direction of joint motions 304). In other words, a plurality of random positional changing singles are sent to actuators that control each of the joints to cause the head portion, neck portion, and sensors to move to distinctly different configurations. Second, at each of these joint configurations, a set of micro-saccades are performed and the direction-to-rotation transform 306 is learned at each camera configuration or context 308. The weights, z, are initiated to zero and will be subsequently adapted on a context basis as and when the appropriate context became active. In these non-limiting simulations, the range of the joints that were used for the seven degrees-of-freedom and the number of discretized zones for each angle is listed in FIG. 4. FIG. 4 is a table of exemplary joint configurations that can be used to create a context field, including the particular joint 400, the minimum angular degree 402 and maximum angular degree 404 for the joint, and the number of angular zones 406 for each joint. This discretization process yielded a total of 77175 contexts (5×5×3×3×7×7×7). At each camera configuration, a total of 100 randomly generated micro-saccades were performed to compute the direction-to-rotation transform for that context. The various parameters used during the learning phase for the equations listed in FIG. 5 are: $\lambda=0.01$, $\alpha=10.0$, $\delta=32.0$, $\gamma=8.0$. FIG. 5 is a table listing exemplary equations 500 that can be solved during the learning phase 502 and the performance phase 504.

All simulations were performed using $4^{th}$ order Runge-Kutta ODE solver with a time step of 0.001. The total duration of learning was 2.5 hours on a Dell XPS computer with a 2 gigabyte (GB) random access memory (RAM).

(4.3) Performance Phase

The performance phase begins when the learning phase is completed. The sequence of steps during the performance phase is summarized in FIG. 3B. In order to saccade to a visible target, the desired spatial direction to the retinal image centers is computed. The desired spatial direction (i.e., direction of target motion 320) is then combined with the context 322 of the visuomotor system and its corresponding direction-to-rotation transform 324 to compute the desired joint angle increments (i.e., direction joint motion 326) of the system. These increments are finally integrated 328 over time to saccade to the 3-D target by providing a new camera configuration 329. This integration 328 step involves a GO signal $G(t)=G_0*t$ 330 that defines the speed at which the saccadic movement is performed. The joint angle increment is multiplied with the GO signal G(t) to obtain the joint angle velocity vector which is integrated to get the new joint angles. In the simulations, $G_0$=25.0. The various parameters used during the performance phase for the equations (including a joint configuration algorithm) listed in FIG. 5 are: $\lambda$=0.01, $\alpha$=40.0, $\delta$=32.0, $\gamma$=8.0, and $\eta$=0.001.

(5) Experimental Results (5.1) Performance: Nominal

The visuomotor system was tested for saccades after the learning phase is completed. The system is able to accurately saccade to 3-D targets within its view and within its visible space (i.e., the target is in front of the camera and within the controllable joint space of the camera). The system uses all seven degrees-of-freedom to generate joint synergies during its movements, an example of which is illustrated in FIGS. 6A through 6C. In FIG. 6C, the 3-D target 600 is shown in the form of a sphere. The camera images of the sphere are processed as a binary image to extract the centroid of the images and the controller moves the system joints to bring the centroid to the center of the camera during a saccade. A chart 602 illustrating exemplary seven degree-of-freedom joint synergies can be seen in FIG. 6A. The chart 602 illustrates angular rotation of seven joints during time. As illustrated in FIG. 6B, the trajectory 604 of the centroid during the saccade is traced for each of the stereo images. Example snapshots from the saccade sequence including the initial 608, intermediate 610, and final 612 configurations are shown in FIG. 6C. The optical axis of both cameras intersects on the sphere 600 in the final 612 configuration, indicating the completion of the saccade. In all simulations, the system begins its saccade with the same initial configuration of the camera without any loss of generality. Also, the system is expected to converge to within a 4 pixel square width of the true camera image center 606 (shown as the crosshair location in FIG. 6B).

(5.2) Performance: Loss of One Degree-Of-Freedom

The visuomotor system was also tested for its ability to handle various constraints and disturbances. The first case is to reduce the degrees-of-freedom of the system to six by preventing the neck portion of the camera from shoulder-to-shoulder movement ($\gamma_N$=0). This situation is now compared to how the system was trained during the learning phase. The camera is still able to accurately saccade to the 3-D target, as shown in FIGS. 7A through 7C. As shown in FIG. 7A, the chart 700 with the plots of the joint positions show the shoulder-to-shoulder movement $\gamma_N$ 702 to be flat, indicating that it is locked during the saccade. As shown in FIG. 7B, the trajectory 704 of the centroid during the saccade is traced for each of the stereo images. Example snapshots from the saccade sequence including the initial 708, intermediate 710, and final 712 configurations are shown in FIG. 7C. The optical axis of both cameras intersects on the sphere 714 in the final 712 configuration, indicating the completion of the saccade.

(5.3) Performance: Loss of One Degree-of-Freedom with Shift in Retinal Center

Figure 8A:
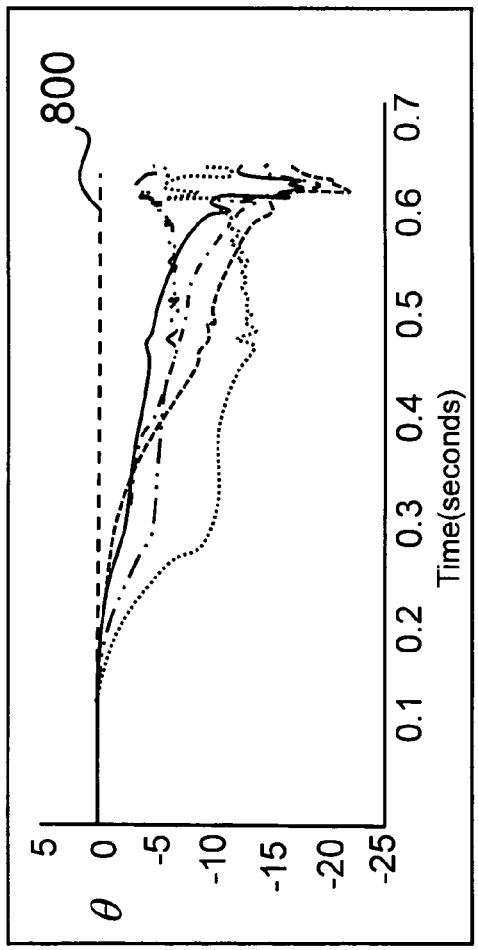
FIG. 8A is a chart illustrating an exemplary saccade sequence of the apparatus of FIG. 1 with one degree-of-freedom fixed and a shift in the image center of the cameras.
Figure 8B:
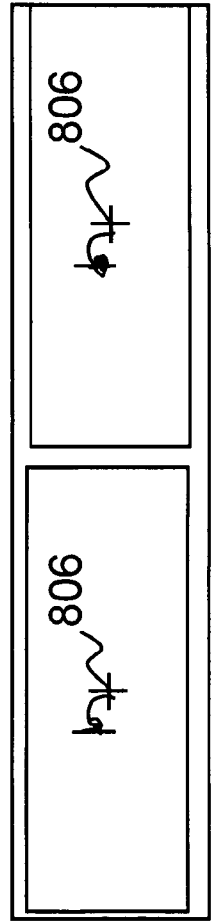
FIG. 8B is an illustration depicting the spatial trajectory of the target of FIG. 1 during the saccade of FIG. 8A.
Figure 8C:
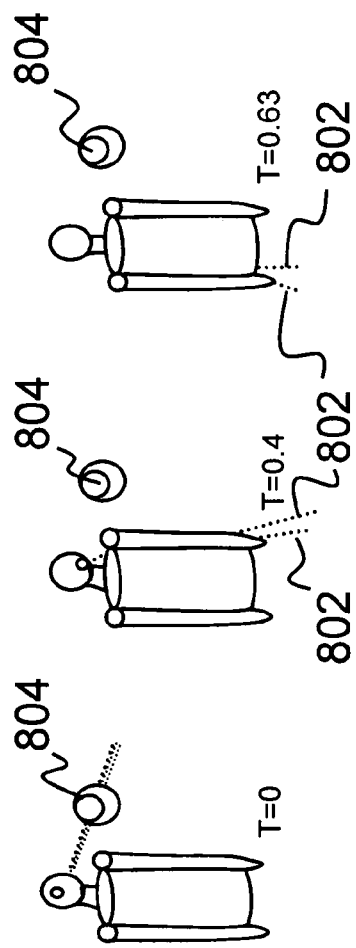
FIG. 8C is an illustration of the apparatus of FIG. 1 during the saccade of FIG. 8A.

As shown in FIG. 8A, the visuomotor system is tested with the same loss of degrees-of-freedom (i.e., $\gamma_N$=0) 800 and an additional new constraint of generating saccades to a new shifted retinal image center. The results in FIGS. 8A through 8C depict that the system is able to cope with both these conditions not encountered during learning phase. As shown in FIG. 8C, it should be noted that the optical axis 802 of the cameras are not intersecting on the sphere 804 due to the new shift in retinal image center (depicted as element 806 in FIG. 8B). The system demonstrates that it is able to compensate its control for this new constraint.

(5.4) Performance: Three Degrees-of-Freedom

Figure 9A:
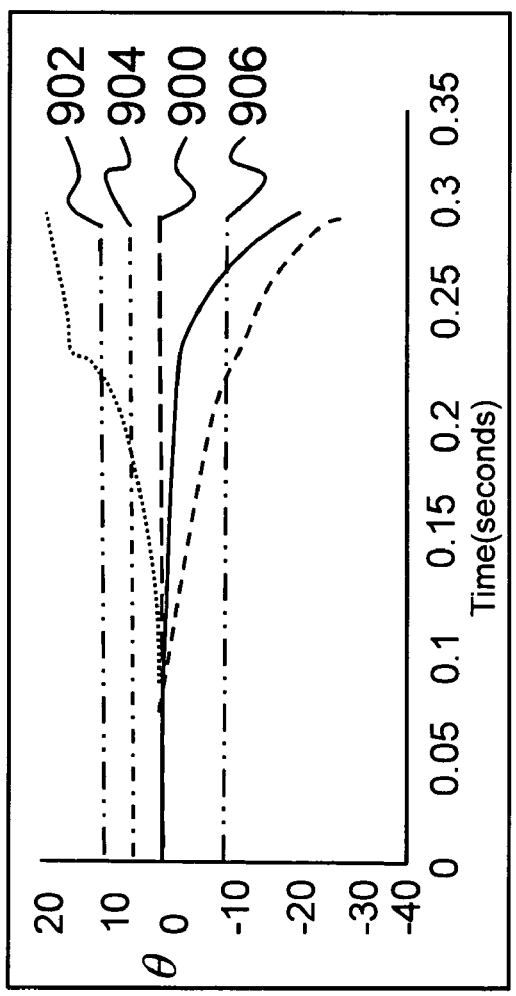
FIG. 9A is a chart illustrating an exemplary saccade sequence of the apparatus of FIG. 1 with four degrees-of-freedom fixed.
Figure 9B:
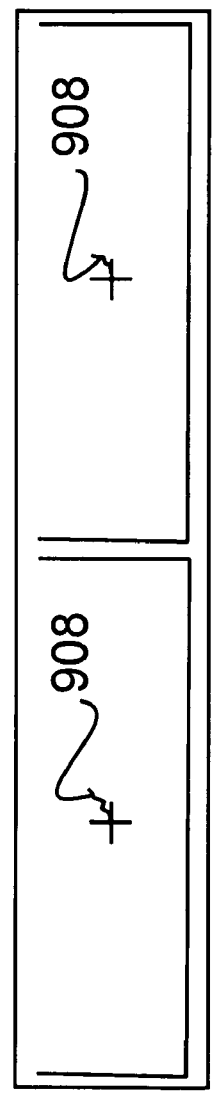
FIG. 9B is an illustration depicting the spatial trajectory of the target of FIG. 1 during the saccade of FIG. 9A.
Figure 9C:
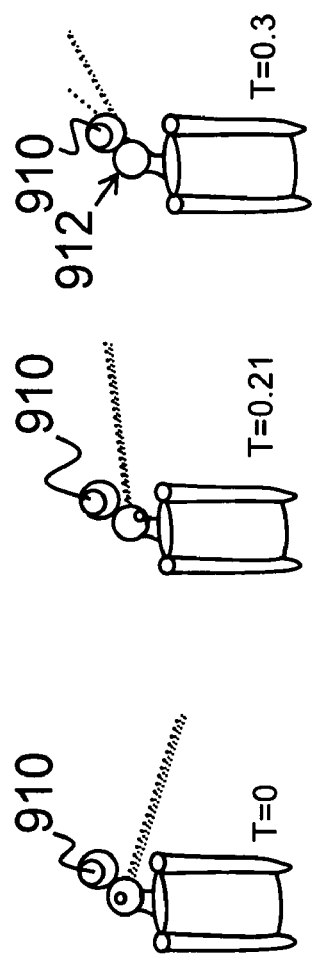
FIG. 9C is an illustration of the apparatus of FIG. 1 during the saccade of FIG. 9A.

As shown in FIG. 9A, the visuomotor system was tested by preventing only the entire head portion and neck portion from moving (i.e., $\alpha_N$=0 900, $\beta_N$=0 902, $\gamma_N$=0 904, and $\alpha_H$=0 906). This reduces the degrees-of-freedom of the system from seven to three. Since the system is expected to saccade to 3-D target, this constraint provides the minimum degrees-of-freedom necessary to saccade to 3-D targets. The results in FIGS. 9A through 9C illustrate how the system copes with the new constraints not seen during the learning phase. Here the system is able to remarkably move just its cameras to saccade to the target, much like a human eye. Again, FIG. 9B illustrates the trajectory 908 of the centroid during the saccade for each of the stereo images. As time progresses, the optical axis of both cameras intersects on the sphere 910 in the final 912 configuration, indicating the completion of the saccade.

Figure 10A:
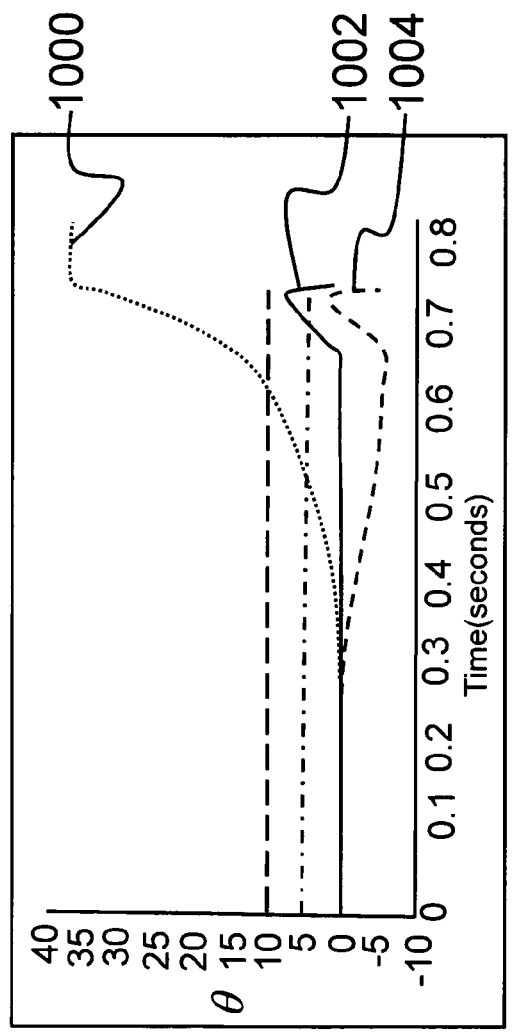
FIG. 10A is a chart illustrating an exemplary saccade sequence of the apparatus of FIG. 1 with four degrees-of-freedom fixed and a change in the baseline distance between the cameras.
Figure 10B:
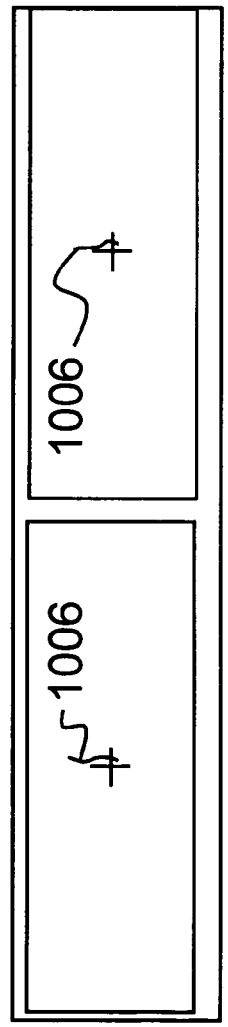
FIG. 10B is an illustration depicting the spatial trajectory of the target of FIG. 1 during the saccade of FIG. 10A.
Figure 10C:
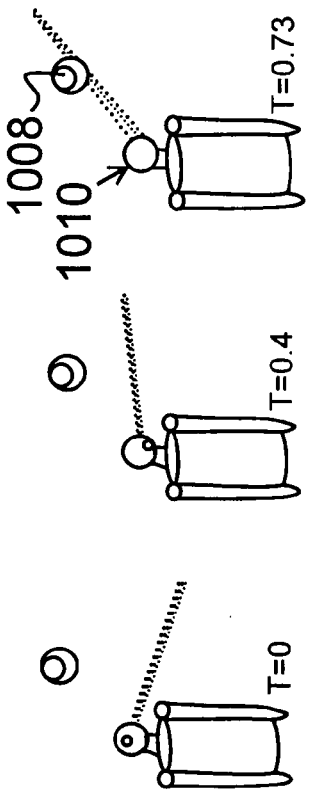
FIG. 10C is an illustration of the apparatus of FIG. 1 during the saccade of FIG. 10A.

(5.5) Performance: Three Degrees-of-Freedom with a Change in the Baseline Distance The visuomotor system was then tested by adding further constraints to the system. Here, the baseline distance between the cameras was increased from 0.17 units during the learning phase to 0.27 units. This change affects the retinal images. However, the learned transformation was immune to this change, as demonstrated in FIGS. 10A through 10C. The system was able to cope with both these constraints and perform accurate saccades to 3-D targets. As shown in FIG. 10A, each of the three remaining joints (i.e., elements 1000, 1002, and 1004) changed their angular positions over a period of time as they cameras attempted to saccade to the 3-D target. FIG. 10B illustrates the trajectory 1006 of the centroid during the saccade for each of the stereo images. As time progresses, the optical axis of both cameras intersected on the sphere 1008 in the final 1010 configuration, indicating the completion of the saccade.

(5.6) Performance: Three Degrees-of-Freedom with Change in Focal Length

Figure 11A:
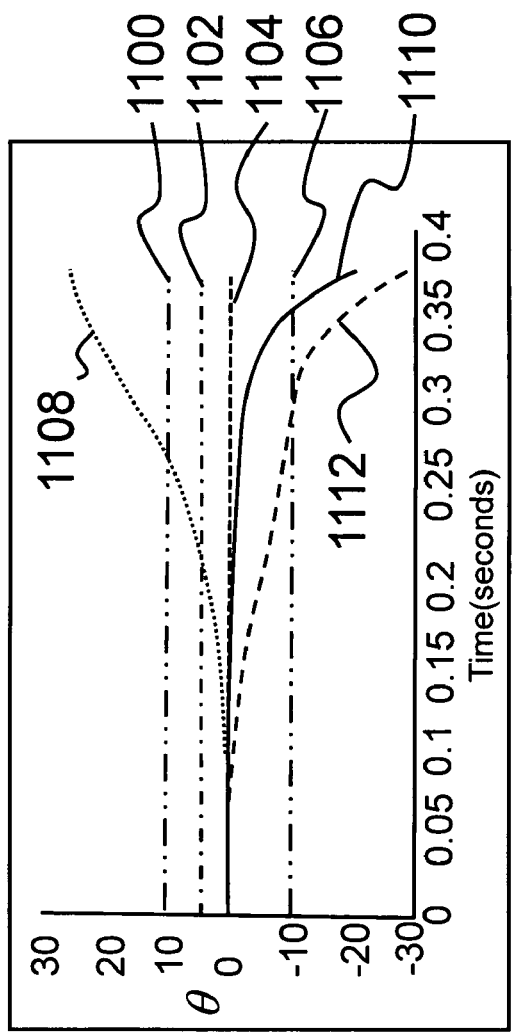
FIG. 11A is a chart illustrating an exemplary saccade sequence of the apparatus of FIG. 1 with four degrees-of-freedom fixed and a change in focal length of the cameras.
Figure 11B:
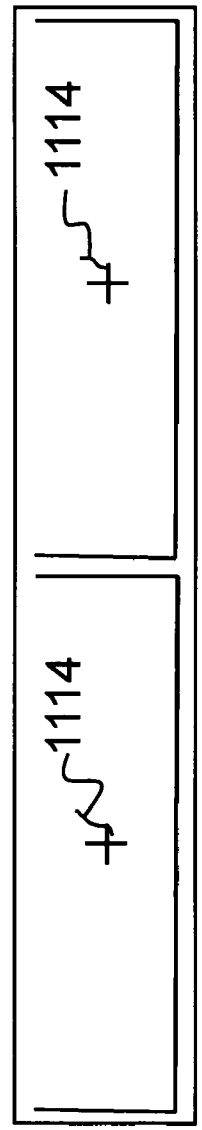
FIG. 11B is an illustration depicting the spatial trajectory of the target of FIG. 1 during the saccade of FIG. 11A.
Figure 11C:
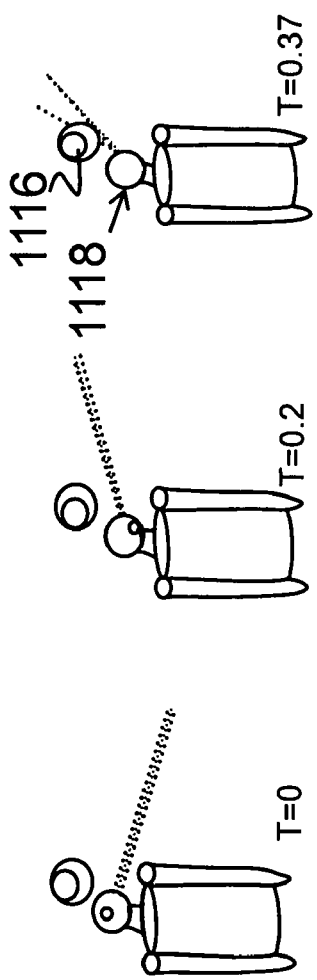
FIG. 11C is an illustration of the apparatus of FIG. 1 during the saccade of FIG. 11A.

The visuomotor system was tested with the same three degrees-of-freedom for the cameras above, but the focal length was changed from 0.15 units in the original system to 0.25 units in the new system. This resulted in shifts in the image registration for both cameras. The learned transformation was immune to this change, as shown in FIGS. 11A through 11C. FIG. 11A illustrates the four fixed joints (i.e., 1100, 1102, 1104, and 1106), with the remaining three degrees-of-freedom (i.e., 1108, 1110, and 1112). FIG. 11B illustrates the trajectory 1114 of the centroid during the saccade for each of the stereo images. As time progresses, the optical axis of both cameras intersected on the sphere 1116 in the final 1118 configuration, indicating the completion of the saccade.

(5.7) Performance: Three Degrees-of-Freedom with Change in Focal Length and Baseline Distance The visuomotor system described above was later further constrained by changing the baseline in distance between the eyes from 0.17 units to 0.27 units. The system was able to perform remarkably well and performed accurate saccades, even with the extreme changes in both the extrinsic and intrinsic parameters. An exemplary result for this experiment is shown in FIGS. 12A through 12C. FIG. 12A illustrates the fixed joints with the remaining three degrees-of-freedom (i.e., 1202, 1204, and 1206). FIG. 12B illustrates the trajectory 1214 of the centroid during the saccade for each of the stereo images. As time progresses, the optical axis of both cameras intersected on the sphere 1216 in the final 1218 configuration, indicating the completion of the saccade.

Figure 13A:
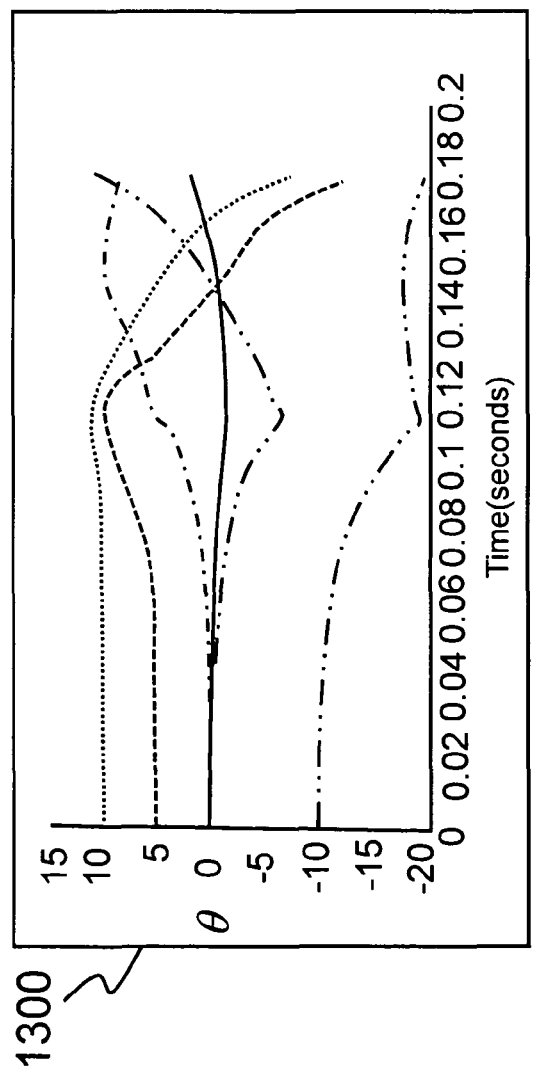
FIG. 13A is a chart illustrating an exemplary saccade sequence of the apparatus of FIG. 1 with a shift in the image center of the cameras, a change in focal length of the cameras, and a change in the baseline distance between the cameras.
Figure 13B:
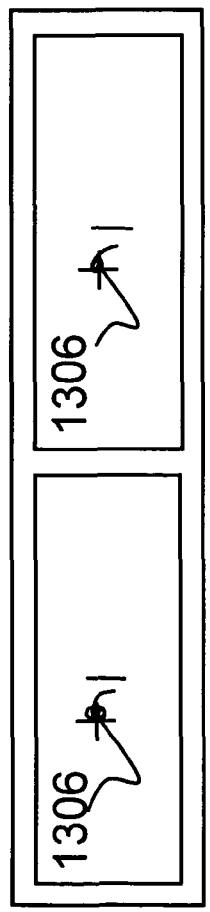
FIG. 13B is an illustration depicting the spatial trajectory of the target of FIG. 1 during the saccade of FIG. 13A.
Figure 13C:
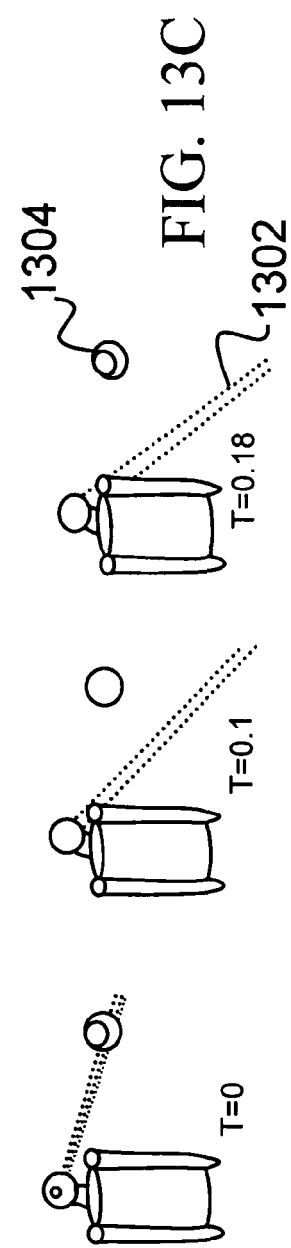
FIG. 13C is an illustration of the apparatus of FIG. 1 during the saccade of FIG. 13A.

(5.8) Performance: Nominal Operation with Change in Focal Length, Baseline Distance, and Shift in Retinal Center The original visuomotor system was also tested to see if it was robust to all the three changes in the intrinsic parameters of a camera (i.e., change in focal length for 0.15 units to 0.25 units, change in baseline distance from 0.17 units to 0.27 units, and also a shift in the center of the image). The system performed accurate saccades and was found to be robust to these changes despite the variation to the parameters presented during the learning phase. An exemplary result for this experiment is shown in FIGS. 13A through 13C. FIG. 13A is a chart 1300 illustrating the joint synergies. As shown in FIG. 13C, it should be noted that the optical axis 1302 of the cameras are not intersecting on the sphere 1304 due to the new shift in retinal image center (depicted as element 1306 in FIG. 13B). The system demonstrates that it is able to compensate its control for this new constraint.

An important feature to point out in all of the performance experiments is that none of these new disturbances or changes were experienced during learning via action-perception cycles. By learning the appropriate transformation, the system is able to flexibly exploit its redundancy to overcome these new changes.

What is claimed is:

1. An electro-mechanical system for tracking a target, the system comprising:
    at least one sensor configured to relay a signal containing positional information of a stimulus;
    at least one actuator configured to manipulate the sensor to enable the sensor to track the stimulus, wherein the actuator includes actuator positional information and is further configured to send the actuator positional information to a processing device and receive a positional changing signal from the processing device;
    a processing device configured to receive the positional information from each sensor and each actuator, and further configured to send a positional changing signal to at least one actuator, wherein the processing device is further configured to adjust at least one positional changing signal according to the information from each sensor and each actuator to enable the actuator to cause the sensor to track the stimulus; and
    wherein the processing device is further configured to perform operations of:
    receiving the positional information of the stimulus from the sensor;
    altering the position of the sensor;
    detecting a change in a perceived position of the stimulus due to the altered position of the sensor;
    using the detected change to adjust parameters in a joint configuration algorithm; and
    producing a positional changing signal in accordance with the joint configuration algorithm to cause the sensor to track the stimulus.

2. A system as set forth in claim 1, wherein the processing device includes a neural network and is further configured to use the neural network to linearly transform sensor information into positional changing signals.

3. A system as set forth in claim 2, wherein the processing device is further configured to:
    enact a learning phase, wherein a plurality of random positional changing signals are sent to the actuators to cause the sensors to move to a distinctly different configuration, and wherein a set of micro-saccades are performed and a direction-to-rotation transform is learned at each different configuration; and
    enact a performance phase, wherein a desired spatial direction to a retinal image center is computed, with the desired spatial direction then combined with a context of the system and the direction-to-rotation transform to compute desired joint angle increments, with the joint angle increments integrated over time to saccade to the stimulus by providing new sensor configurations.

4. A system as set forth in claim 3, wherein in the performance phase, the processing device is further configured to compute new joint angles by multiplying the joint angle increments with a GO signal to obtain a joint angle velocity vector.

5. A system as set forth in claim 4, wherein in the learning phase, the processing device is further configured to use the neural network to vary a weight of network connections within the neural network between input signals and output signals according to the following equation:

$$\frac{dz_{ijk}}{dt} = -\gamma V_{ik} S_j,$$

wherein, $z_{ijk}$ is the weight of the network connection between sensor information $S_j$ and an output signal $V_{ik}$ while actuators are in state i, and $\gamma\ \square$ is a learning constant.

6. A system as set forth in claim 5, wherein at least one sensor is able to detect the presence and current position of a stimulus through a technique selected from a group consisting of electromagnetically, aurally, tactilely, and visually.

7. A system as set forth in claim 1, wherein the processing device is further configured to:
    enact a learning phase, wherein a plurality of random positional changing signals are sent to the actuators to cause the sensors to move to a distinctly different configuration, and wherein a set of micro-saccades are performed and a direction-to-rotation transform is learned at each different configuration; and
    enact a performance phase, wherein a desired spatial direction to a retinal image center is computed, with the desired spatial direction then combined with a context of the system and the direction-to-rotation transform to compute desired joint angle increments, with the joint angle increments integrated over time to saccade to the stimulus by providing new sensor configurations.

8. A system as set forth in claim 7, wherein in the performance phase, the processing device is further configured to compute new joint angles by multiplying the joint angle increments with a GO signal to obtain a joint angle velocity vector.

9. A system as set forth in claim 7, wherein in the learning phase, the processing device is further configured to use the neural network to vary a weight of network connections within the neural network between input signals and output signals according to the following equation:

$$\frac{dz_{ijk}}{dt} = -\gamma V_{ik} S_j,$$

wherein, $z_{ijk}$ is the weight of the network connection between sensor information $S_j$ and an output signal $V_{ik}$ while actuators are in state i, and $\gamma\ \square$ is a learning constant.

10. A system as set forth in claim 1, wherein the processing device includes a neural network and is further configured to use a neural network to linearly transform sensor information into positional changing signals.

11. A system as set forth in claim 1, wherein at least one sensor is able to detect the presence and current position of a stimulus through a technique selected from a group consisting of electromagnetically, aurally, tactilely, and visually.

12. A method for tracking a target, the method comprising acts of:
relaying a signal containing positional information of a stimulus from at least one sensor to a processing device;
manipulating the sensor with an actuator to enable the sensor to track the stimulus, wherein the actuator includes actuator positional information and is further configured to send the actuator positional information to the processing device and receive a positional changing signal from the processing device;
receiving the positional information from each sensor and each actuator; and
sending a positional changing signal to at least one actuator, wherein the processing device is further configured to adjust at least one positional changing signal according to the information from each sensor and each actuator to enable the actuator to cause the sensor to track the stimulus;
receiving the positional information of the stimulus from the sensor;
altering the position of the sensor;
detecting a change in a perceived position of the stimulus due to the altered position of the sensor;
using the detected change to adjust parameters in a joint configuration algorithm; and
producing a positional changing signal in accordance with the joint configuration algorithm to cause the sensor to track the stimulus.

13. A method as set forth in claim 12, further comprising an act of linearly transforming sensor information into positional changing signals.

14. A method as set forth in claim 13, further comprising acts of:
enacting a learning phase, wherein a plurality of random positional changing signals are sent to the actuators to cause the sensors to move to a distinctly different configuration, and wherein a set of micro-saccades are performed and a direction-to-rotation transform is learned at each different configuration; and
enacting a performance phase, wherein a desired spatial direction to a retinal image center is computed, with the desired spatial direction then combined with a context of the system and the direction-to-rotation transform to compute desired joint angle increments, with the joint angle increments integrated over time to saccade to the stimulus by providing new sensor configurations.

15. A method as set forth in claim 14, further comprising an act of computing new joint angles by multiplying the joint angle increments with a GO signal to obtain a joint angle velocity vector.

16. A method as set forth in claim 15, further comprising an act of varying a weight of network connections within the neural network between input signals and output signals according to the following equation:

$$\frac{dz_{ijk}}{dt} = -\gamma V_{ik} S_j,$$

wherein, $z_{ijk}$ is the weight of the network connection between sensor information $S_j$ and an output signal $V_{ik}$ while actuators are in state i, and $\gamma$ □ is a learning constant.

17. A method as set forth in claim 16, further comprising an act of detecting a presence and current position of a stimulus through a technique selected from a group consisting of electromagnetically, aurally, tactilely, and visually.

18. A method as set forth in claim 12, further comprising an act of linearly transforming sensor information into positional changing signals.

19. A method as set forth in claim 12, further comprising an act of computing new joint angles by multiplying the joint angle increments with a GO signal to obtain a joint angle velocity vector.

20. A method as set forth in claim 12, further comprising an act of varying a weight of network connections within a neural network between input signals and output signals according to the following equation:

$$\frac{dz_{ijk}}{dt} = -\gamma V_{ik} S_j,$$

wherein, $z_{ijk}$ is the weight of the network connection between sensor information $S_j$ and an output signal $V_{ik}$ while actuators are in state i, and $\gamma$ □ is a learning constant.

21. A method as set forth in claim 12, further comprising an act of detecting a presence and current position of a stimulus through a technique selected from a group consisting of electromagnetically, aurally, tactilely, and visually.

22. A computer program product for tracking a target, the computer program product comprising computer-readable instruction means stored on a non-transitory computer-readable medium that are executable by a processing device for causing the processing device to perform operations of:
relaying a signal containing positional information of a stimulus;
manipulating a sensor with an actuator to enable the sensor to track the stimulus, wherein the actuator includes actuator positional information and is further configured to send the actuator positional information to a processing device and receive a positional changing signal from the processing device;
receiving the positional information from each sensor and each actuator;
sending a positional changing signal to at least one actuator; and
adjusting at least one positional changing signal according to the information from each sensor and each actuator to enable the actuator to cause the sensor to track the stimulus;
receiving the positional information of the stimulus from a sensor;
altering the position of the sensor;
detecting a change in a perceived position of the stimulus due to the altered position of the sensor;
using the detected change to adjust parameters in a joint configuration algorithm; and
producing a positional changing signal in accordance with the joint configuration algorithm to cause the sensor to track the stimulus.

23. A computer program product as set forth in claim 22, further comprising instruction means for causing a processing device to perform an operation of linearly transforming sensor information into positional changing signals.

24. A computer program product as set forth in claim 22, further comprising instruction means for causing a processing device to perform operations of:
- enacting a learning phase, wherein a plurality of random positional changing signals are sent to the actuators to cause sensors to move to a distinctly different configuration, and wherein a set of micro-saccades are performed and a direction-to-rotation transform is learned at each different configuration; and
- enacting a performance phase, wherein a desired spatial direction to a retinal image center is computed, with the desired spatial direction then combined with a context of the system and the direction-to-rotation transform to compute desired joint angle increments, with the joint angle increments integrated over time to saccade to the stimulus by providing new sensor configurations.

25. A computer program product as set forth in claim 22, further comprising instruction means for causing a processing device to perform an operation of computing new joint angles by multiplying the joint angle increments with a GO signal to obtain a joint angle velocity vector.

26. A computer program product as set forth in claim 22, further comprising instruction means for causing a processing device to perform an operation of varying a weight of network connections within a neural network between input signals and output signals according to the following equation:

$$\frac{dz_{ijk}}{dt} = -\gamma V_{ik} S_j,$$

wherein, $z_{ijk}$ is the weight of a network connection between sensor information $S_j$ and an output signal $V_{ik}$ while actuators are in state i, and $\gamma$ □ is a learning constant.

27. A computer program product as set forth in claim 22, further comprising instruction means for causing a processing device to perform an operation of detecting a presence and current position of a stimulus through a technique selected from a group consisting of electromagnetically, aurally, tactilely, and visually.

* * * * *